(12) United States Patent
Vannithamby (10) Patent No.: US 8,175,031 B2
(45) Date of Patent: May 8, 2012

(54) METHOD AND APPARATUS FOR SUPPORTING PACKET DATA SERVICES IN SERVICE AREA BOUNDARY REGIONS

(75) Inventor: Rath Vannithamby, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 884 days.

(21) Appl. No.: 10/992,301

(22) Filed: Nov. 18, 2004

(65) Prior Publication Data

US 2006/0104229 A1    May 18, 2006

(51) Int. Cl.
*H04W 4/00* (2009.01)
(52) U.S. Cl. ........ 370/328; 455/436; 455/437; 455/438; 455/439; 455/440; 455/441; 455/442; 455/443; 455/444; 455/450
(58) Field of Classification Search ............... 455/452.2, 455/436, 437, 438, 439, 440, 441, 442, 443, 455/444, 450; 370/328
See application file for complete search history.

(56) References Cited

U.S. PATENT DOCUMENTS

| | | | | |
|---|---|---|---|---|
| 5,953,661 | A * | 9/1999 | Schwinghammer et al. | 455/423 |
| 6,374,112 | B1 * | 4/2002 | Widegren et al. | 455/452.2 |
| 6,493,328 | B2 | 12/2002 | Fong et al. | |
| 6,760,303 | B1 * | 7/2004 | Brouwer | 370/229 |
| 2002/0183066 | A1 * | 12/2002 | Pankaj | 455/453 |
| 2003/0054807 | A1 | 3/2003 | Hsu et al. | |
| 2003/0142648 | A1 | 7/2003 | Semper | |
| 2004/0156341 | A1 * | 8/2004 | Cheng et al. | 370/335 |
| 2004/0176090 | A1 | 9/2004 | Madigonda et al. | |
| 2004/0203336 | A1 * | 10/2004 | Sinnarajah et al. | 455/3.01 |
| 2005/0090276 | A1 * | 4/2005 | Rajkotia | 455/515 |
| 2005/0138528 | A1 * | 6/2005 | Ameigeiras et al. | 714/774 |
| 2005/0208959 | A1 * | 9/2005 | Chen et al. | 455/515 |

FOREIGN PATENT DOCUMENTS

| | | |
|---|---|---|
| CN | 1277502 A | 12/2000 |
| CN | 1463564 A | 12/2003 |
| EP | 159739 A2 | 12/2000 |
| GB | 2339645 | 2/2000 |

(Continued)

OTHER PUBLICATIONS

Soong, Anthony C. K. et al. "Forward High-Speed Wireless Packet Data Service in IS-2000—1xEV-DV." IEEE Communications Magazine, Aug. 2003, pp. 170-177, vol. 41, No. 8, IEEE Services, New York, NY, XP001177716.

(Continued)

*Primary Examiner* — Patrick Edouard
*Assistant Examiner* — Shantell L Heiber
(74) *Attorney, Agent, or Firm* — Coats & Bennett, P.L.L.C.

(57) ABSTRACT

A method of providing packet data service is based on selectively switching packet data traffic for a mobile station operating in a boundary region between two service areas from a shared packet data channel to a dedicated packet data channel, or vice versa. For example, a source base station can be configured to switch packet data traffic for a mobile station from a shared packet data channel to a dedicated packet data channel as it approaches a shared channel service boundary. Additionally, the source base station can be configured to change the packet data service to the mobile station from a dedicated packet data channel to a shared packet data channel, such as when the mobile station moves back into the source base station's service area.

11 Claims, 5 Drawing Sheets

FOREIGN PATENT DOCUMENTS

| | | |
|---|---|---|
| GB | 2376603 A | 12/2002 |
| JP | 2002-135823 A | 5/2002 |
| JP | 2002-369235 A | 12/2002 |
| WO | WO 99/14975 | 3/1999 |
| WO | WO 02/01897 | 1/2002 |
| WO | 02/067606 A2 | 8/2002 |
| WO | WO 02/067606 | 8/2002 |
| WO | 2004/054291 A1 | 6/2004 |

OTHER PUBLICATIONS

Non-Final Office Action mailed Jul. 16, 2007 in U.S. Appl. No. 11/018,36, filed Dec. 21, 2004.

* cited by examiner

METHOD AND APPARATUS FOR SUPPORTING PACKET DATA SERVICES IN SERVICE AREA BOUNDARY REGIONS

BACKGROUND OF THE INVENTION

The present invention generally relates to providing packet data service to mobile stations, and particularly relates to providing packet data service in the boundary regions of wireless communication network service areas.

In the context of wireless communication networks, one might fairly view some of the developing changes as evolutionary, and some of them as revolutionary. Evolutionary changes typically build on pre-existing capabilities and protocols, and usually include provisions to ensure backward compatibility. On the other hand, revolutionary changes typically represent a departure from prior practices, and are oftentimes incompatible with the existing standards. These disadvantages usually are offset by performance or efficiency improvements that simply cannot be achieved while preserving backwards compatibility.

Generally, cdma2000 networks include a mix of evolutionary and revolutionary technologies. For example, the older IS-95B networks standard provided low-rate dedicated channels on the forward link supporting circuit-switched voice and data services. For backwards compatibility, cdma2000 network standards preserved these low-rate forward link channels, referred to as Forward Fundamental Channels (F-FCHs). However, these low rate channels may be used for circuit-switched and packet-switched services in cdma2000 networks, albeit limited to typical data rates of 9.6 Kbps.

In a revolutionary break from the pre-existing IS-95B channel definitions, cdma2000 standards defined a new type of dedicated forward link channel, the Forward Supplemental Channel (F-SCH). One or more F-SCHs can be assigned as needed to individual mobile stations to support higher-rate packet data services. F-SCHs can support packet data rates greater than 500 kbps, and have the further advantage of being supported in soft handoff. That is, packet data traffic for F-SCH service to a given mobile station can be sent from the mobile station's source Base Station (BS) to one or more neighboring BSs over the sidehaul links used to communicatively link BSs. The controlling Interoperability Standards (IOSs) define these sidehaul links as the A3/A7 interfaces.

Assuming that a source base station has established a F-SCH with a given mobile station, the F-SCH can be transferred in soft handoff to a neighboring, target base station responsive to the mobile station moving into (or through) a boundary region between the source and target base stations' service areas. To accomplish this, the source base station requests that the target base station setup a F-SCH for the mobile station and, assuming that the request is successful, the source base station begins sending packet data traffic for the mobile station over the A3/A7 sidehaul links for transmission by the target base station on the newly assigned F-SCH.

Since the source base station at least temporarily continues transmitting that packet data on its own F-SCH, the mobile station is served from both the source and target base stations. Of course, if the mobile station moves back toward the source base station, the target base station may tear down its F-SCH. Conversely, if the mobile station moves further away from the source base station, the source base station may tear down its F-SCH, although it continues sending packet data for the mobile station out over the sidehaul links as needed.

As much as F-SCHs have improved achievable packet data service rates in cdma2000 networks, they are not without their drawbacks. For example, F-SCHs are not necessarily efficient in terms of the network resources they utilize. For example, higher F-SCH data rates requires more CDMA spreading code resources—thereby reducing the codes available for other users—and requires potentially significant forward link transmit power—thereby reducing the power available for other users. Newer revisions of the cdma2000 standards address the need for providing efficient higher-rate packet data services by way of defining a new forward link packet data channel type, namely the Forward Packet Data Channel (F-PDCH).

By assigning multiple users to the F-PDCH in a time-sharing arrangement according to a dynamically maintained transmission schedule, one F-PDCH can support high-rate packet data services to a relatively large number of users. That feature obviates the need for allocating dedicated F-SCHs to each user desiring high-rate packet data services. Further, the F-PDCH is transmitted as a rate-controlled channel rather than as a power-controlled channel—F-SCHs in contrast are power-controlled channels.

More particularly, the F-PDCH is transmitted using whatever "leftover" transmit power is available at the RBS after allocating power to the dedicated channels, the broadcast and control channels, and the pilot channel(s). To serve each mobile station at the highest rate supportable given the available F-PDCH transmit power the particular reception conditions prevailing at the mobile station, each mobile station returns Channel Quality Indicator (CQI) reports at a high rate (e.g., 800 Hz). The RBS then sets the individual data rates for transmitting to the individual mobile stations on the F-PDCH based on receiving these CQI reports.

The upshot of this sophistication is that the F-PDCH offers the two-fold advantage of providing typically higher packet data service rates to mobile stations as compared to the rates achievable with dedicated F-SCHs, and offers more efficient utilization of network resources as compared to the use of dedicated F-SCHs. In at least some contexts, however, the F-PDCH suffers from one or more disadvantages.

First, the existing IOSs do not provide for soft handoff of the F-PDCH between different base stations—note the F-PDCH can be handed off between different RBSs operating under control of the same Base Station Controller, assuming the involved RBSs each support the F-PDCH. Second, in a given network, not every RBS will be configured to support the F-PDCH, thus giving rise to different service areas having mixed capabilities. That is, two adjacent service areas may both support F-SCH packet data service, but only one of them supports F-PDCH packet data service.

In the first instance, packet data service on the F-PDCH cannot be continued across the boundary region between source and target base station service areas because the source base station has no defined mechanism for sharing the packet data traffic across its A3/A7 sidehaul links with the target base station. In the second instance, packet data service on the F-PDCH cannot be continued across the boundary region between source and target base station service areas simply because the target base station does not support the F-PDCH. In both instances, the problem of continuing high-rate packet data services to a mobile station moving in, or through, a boundary region is left unaddressed.

SUMMARY OF THE INVENTION

The present invention comprises a method and apparatus supporting packet data service to mobile stations by switching between shared and dedicated packet data channels to continue packet data service in and across base station service boundaries and shared packet data channel service boundaries. According to the present invention, a given mobile station may be switched from a shared packet data channel to a dedicated packet data channel as it moves into the boundary region of a first service area having adjacent service areas not supporting handoff of the shared packet data channel, or not offering shared packet data channel service. For example, the switchover between channel types can be made responsive to determining whether the first or adjacent service areas offer better received signal quality to the mobile station, determining whether network resources are better utilized by providing shared or dedicated channel service, and/or determining that the shared or dedicated channel service offers better quality of service to the mobile station.

In one embodiment, the present invention thus comprises a method of providing packet data service to a mobile station based on serving the mobile station in a first service area of a wireless communication network using a shared packet data channel, and switching packet data traffic for the mobile station from the shared packet data channel to a dedicated packet data channel responsive to detecting that the mobile station is in a boundary region of the first service area. The boundary region may be associated with adjacent service areas controlled by other base stations that do not support the shared packet data channel at all, or that are not configured to support shared packet data channel handoffs.

In determining whether (and when) to switch packet data traffic for the mobile station from a shared packet data channel to a dedicated packet data channel, or vice versa, a source base station may evaluate radio link signal qualities for itself and one or more neighboring base stations associated with the boundary region. For example, the source base station may monitor signal quality reports from the mobile station, and switchover from a shared channel to a dedicated channel responsive to detecting that the mobile station is in a boundary region. However, because data rates typically are higher on the shared channel, at least until the radio link quality between the source base station and the mobile station that support the shared channel deteriorates, the source base station may be configured to continue packet data service for as long as practicable as the mobile station moves through the boundary region.

For an exemplary cdma2000-based embodiment of the present invention, the shared packet data channel comprises a Forward Packet Data Channel (F-PDCH) that is used to carry high-rate packet data traffic for a plurality of mobile stations (users) according to time-multiplexed transmissions of individual user data on a CDMA carrier signal. In this same context, the dedicated packet data channel comprises a Forward Supplemental Channel (F-SCH). F-SCHs are assigned to individual mobile stations as needed to support higher packet data rates than can be supported with dedicated Forward Fundamental Channels (F-FCHs). In general, the network resource utilization of F-SCHs is less efficient than the F-PDCH for high-rate packet data services, so F-PDCH service, if available, is preferred.

By operation of the present invention, a base station controller—e.g., a cdma2000 base station controller (BSC)—can include one or more processing circuits configured to switch the packet data traffic for a given mobile station from a shared packet data channel to a dedicated packet data channel, or vice versa, in accordance with the present invention's exemplary methods. For example, a source BSC can establish packet data service for a given mobile station on a F-PDCH transmitted by a Radio Base Station (RBS) that is controlled by the source BSC. Packet data service on the F-PDCH can be continued for intra-BSC handoffs between the RBSs controlled by the source BSC that support the F-PDCH. However, for intra-BSC handoffs to RBS not supporting the F-PDCH, or for inter-BSC handoffs to another BSC, the source BSC can switch the mobile station's packet data traffic from the F-PDCH to a F-SCH, with the advantage that the F-SCH generally is supported by all RBSs, and can be maintained during soft handoffs between BSCs.

Of course, the present invention's channel switchover methods are not limited to cdma2000 embodiments, nor limited to the above features and advantages. Those skilled in the art will recognize additional features and advantages upon reading the following detailed description, and upon viewing the accompanying figures.

DETAILED DESCRIPTION OF THE INVENTION

In an exemplary embodiment, the present invention comprises a base station method and apparatus for providing continued packet data service in cdma2000 networks, wherein high-rate shared packet data channels are supported in one service area, but not supported in an adjacent service area, or where no mechanism is provided to handoff such channels between service areas. However, the present invention can be broadly understood as providing a method and apparatus for changing the packet data service for a given mobile station from a channel type that cannot be handed off across service area boundaries, to a channel type that can be handed off.

Figure 1:
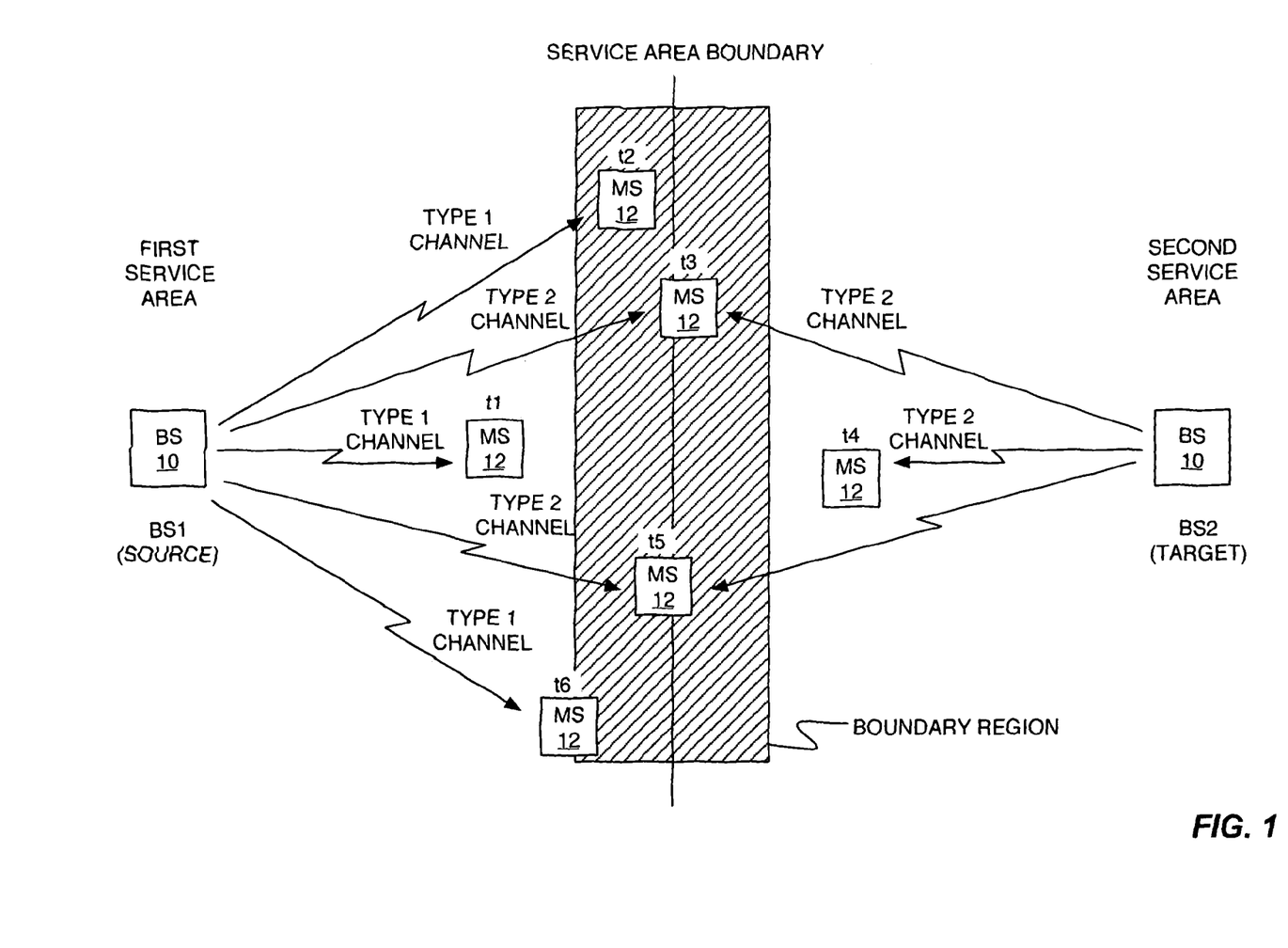
FIG. 1 is a diagram of a source and target base station, wherein the source base station is configured to provide packet data service to a mobile station in accordance with one or more embodiments of the present invention.

FIG. 1 thus illustrates two base stations 10, labeled "BS1" and "BS2" for convenience. BS1 can provide high-rate packet data service using a "Type 1" channel or using a "Type 2" channel, with these labels being generically representative of two different packet data channel types. In a cdma2000 embodiment, a Type 1 channel comprises the Forward Packet Data Channel (F-PDCH), which is a shared packet data channel that is configured to serve a plurality of packet data users at relatively high rates. In the same context, a Type 2 channel comprises a Forward Supplemental Channel (F-SCH), which is a dedicated (user-specific) channel that is configured to serve one packet data user at higher data rates than can be achieved with Forward Fundamental Channels (F-FCH). F-PDCHs are preferred over F-SCHs as being more efficient in terms of network resource utilization and because they generally offer higher effective data rates.

For purposes of the illustration, one may assume that BS2 either lacks Type 1 channel compatibility—i.e., it does not offer packet data service on Type 1 channels—or that no defined mechanism is available for handing off Type 1 channels between BS1 and BS2. Thus, FIG. 1 illustrates an exemplary method of providing packet data service to a mobile station 12 that begins packet data service at time t1 on a Type 1 packet data channel in a first service area associated with BS1, but later moves through a boundary region with an adjacent, second service area associated with BS2.

As shown, the mobile station 12 enters the boundary region at time t2, but BS1 continues packet data service to it on the Type 1 channel because it still has a radio link with the mobile station 12 that is of sufficient quality. Note that in one embodiment of the present invention, BS1 may use its detection of the mobile station 12 entering a boundary region as a trigger to change channel types, regardless of whether it still has sufficient radio link quality relative to the mobile station 12 to maintain service on the Type 1 channel.

As for detecting entry by the mobile station 12 into the boundary region, BS1 can do so based on monitoring signal quality reports from the mobile station 12. For example, when the mobile station 12 is in a boundary region, Periodic Pilot Strength Measurement Messages (PPSMMs), or the like, returned from the mobile station 12 will include pilot strength measurements for one or more neighboring base stations controlling the adjacent service areas associated with the boundary region. Thus, BS1 may detect that the received signal strength for its pilot is decreasing at the mobile station, while the received signal strength for BS2 is increasing.

Thus, one might expect deteriorating radio link quality at the mobile station 12 relative to BS1 and improving radio link quality relative to BS2, as the mobile station moves deeper into the boundary region from time t2 to time t3. Therefore, at some signal quality threshold, or based on evaluating the service quality associated with continued service on the Type 1 channel versus a service changeover to a Type 2 channel, BS1 switches the packet data traffic for the mobile station 12 from the Type 1 channel to a Type 2 channel, which BS1 may setup and assign as part of the changeover process. Because the Type 2 channel is available in both service areas, and because handoff of Type 2 channels is supported across the boundary region, this action allows BS2 to begin serving the mobile station 12 on another Type 2 channel, such that the mobile station 12 is served on the Type 2 channels in soft handoff.

Because BS1 still acts as the source or controlling base station, the packet data traffic targeted to the mobile station is transmitted by BS1 on its Type 2 channel, and also sent over sidehaul links between BS1 and BS2, for transmission by BS2 on its Type 2 channel. With its packet data traffic being transmitted at least temporarily by both base stations, service to the mobile station 12 can be reliably maintained across and through the boundary region. Note that the data rate achievable on the Type 2 channel may not be as high as previously achieved on the Type 1 channel under good signal conditions, even with the benefit of soft handoff diversity gains at the mobile station. Even so, once the signal quality of the Type 1 channel deteriorates beyond a given threshold, service quality on the Type 2 channel is likely to be superior, and likely represents a more efficient use of network resources.

At some point, e.g., time t4, the mobile station 12 has moved through the boundary region and is entirely within the second service area, and thus may be out of the effective radio range of BS1. Packet data service continues, however, with BS2 providing service on the Type 2 channel assigned by it to the mobile station 12. Note, the data for transmission by BS2 still is being sent across the BS1-BS2 sidehaul links, and BS1 still operates as the source or controlling base station for the duration of the packet data call.

Sometime later at time t5, the mobile station 12 moves back into the boundary region and it again may be served in soft handoff between BS1 and BS2 using Type 2 channels. However, as mobile station 12 continues moving back toward BS1, such as shown at time t6, received signal quality at the mobile station 12 relative to BS1 generally improves. BS1 continues monitoring received signal quality reports from the mobile station 12 and, at some point, soft handoff with BS2 ends and BS1 may switch the packet data traffic for the mobile station 12 back to the Type 1 channel and tear down the Type 2 channel.

Figure 2:
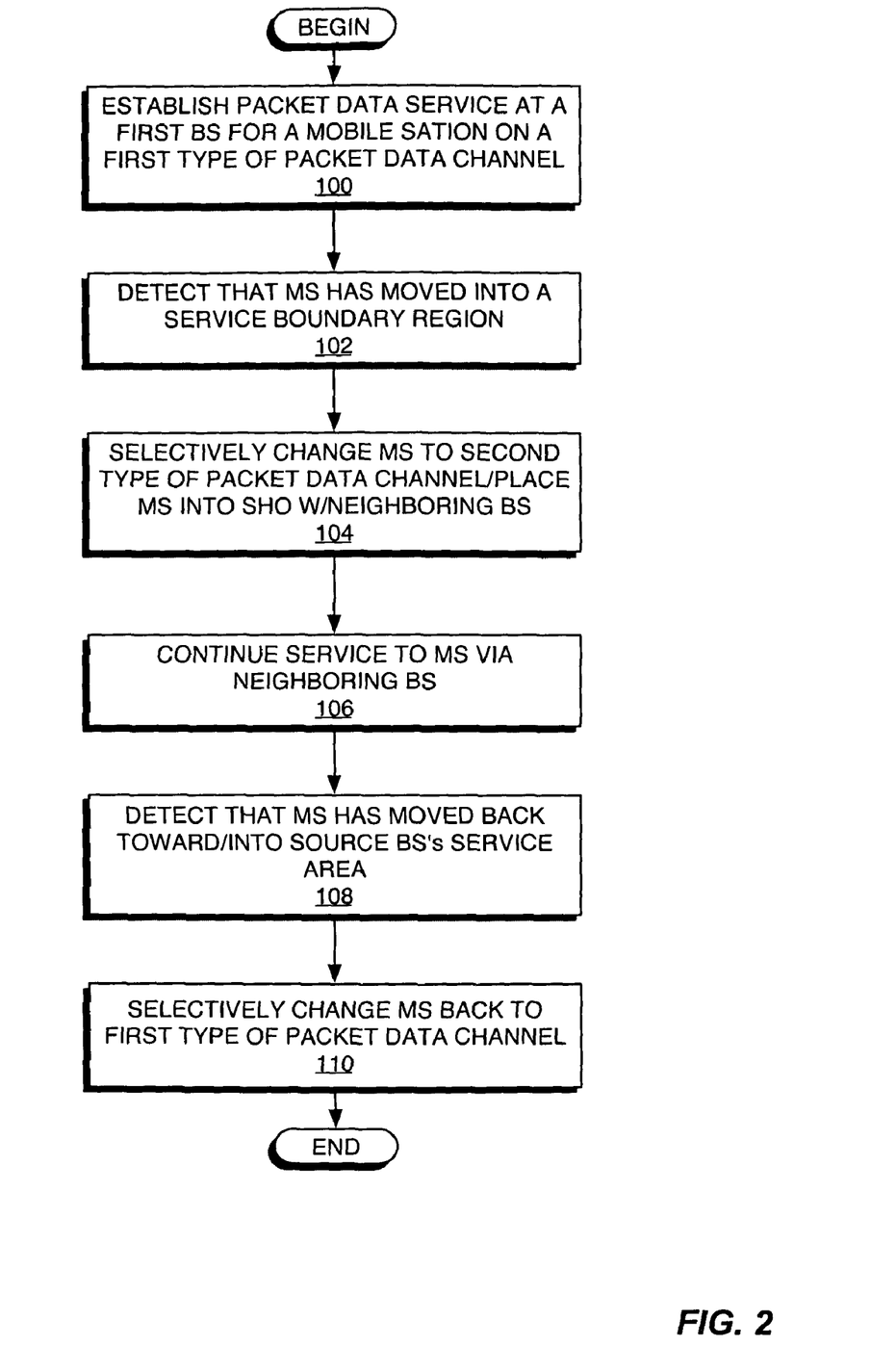
FIG. 2 is a diagram of exemplary processing logic for packet data channel switchover in the context of FIG. 1, for example.

FIG. 2 illustrates exemplary base station processing logic that embodies the above method of providing packet data service in and across packet data service boundaries. As is understood in the art, a typical base station comprises one or more general purpose and/or special purpose processing circuits that include one or more microprocessors, Digital Signal Processors (DSPs), Application Specific Integrated Circuits (ASICs), Field Programmable Gate Arrays (FPGAs), or Complex Programmable Logic Devices (CPLDs), or other digital processing circuits. Thus, the illustrated processing logic can be implemented at base stations 10 in hardware, software, or any combination thereof. In an exemplary embodiment, the present invention is embodied as stored program instructions for execution by one or more digital processing circuits.

With that in mind, processing begins at a first base station 10 with establishing packet data service (call) to a mobile station 12 on a first type of packet data channel (Step 100). At some point during the call, the base station 10 detects that the mobile station 12 has moved into a service boundary region (Step 102). As noted, such detection can be based on a receiving signal quality reports from the mobile station 12, in which the pilot signal strengths from the first base station 10, and one or more neighboring, adjacent base stations 10 can be evaluated. In at least one embodiment, base stations 10 are configured to monitor the signal strengths of base stations designated as members of the mobile station's "active set" as the basis for determining whether the mobile station 12 is in a boundary region. Additionally, or alternatively, base stations 10 may be configured to monitor other forms of signal quality reports, such as the Channel Quality Indicator (CQI) reports sent by certain types of CDMA mobile stations operating on high-speed shared packet data channels.

However the first base station 12 is configured to detect boundary region operation of the mobile station 12, it is configured to selectively changeover the packet data service to the mobile station 12 from the first type of packet data channel to a second type of packet data channel responsive to such detection (Step 104). As previously described, this may comprise switching the mobile station's packet data traffic from a shared channel to a newly assigned dedicated channel. Further, the base station may place the mobile station 12 into soft handoff on the newly assigned dedicated channel with one or more neighboring base stations 10 associated with the boundary area, and thus continue providing packet data service to the mobile station 12 via the one or more neighboring base stations (Step 106).

Assuming that the mobile station 12 subsequently moves back into (or at least back toward) the service area of the first base station 10, such movement and concomitant improvement of received signal quality relative to the first base station 10 is detected (Step 108). The first base station 10 may then selectively switch the packet data traffic for the mobile station back from the second type of packet data channel to the first type of packet data channel (Step 110). In a cdma2000-based embodiment, this step may comprise changing the mobile station 12 from the previously assigned F-SCH back to the F-PDCH of the first base station 10. It should be understood, however, that base station 10 may choose to continue serving the mobile station 12 on the second type of channel for the duration of the call, or at least for some desired time after mobile station 12 moves back within radio range of the first base station 10.

For example, the first base station 10 may continue serving mobile station 12 on the second type of channel to preserve soft handoff conditions for as long as possible, or because serving it on its other type of packet data is not desirable given current network conditions, such as congestion or loading. For example, the first base station 10 could be configured to continue F-SCH service to the mobile station 12 if its shared F-PDCH is already congested, etc.

Those skilled in the art will appreciate that such details can be varied according to particular network capabilities, layouts, and service objectives. All such variations in triggering channel switchover as the mobile station 12 moves away from the source base station 10, or switchback as it moves back toward the source base station 10 are contemplated herein.

Figure 3:
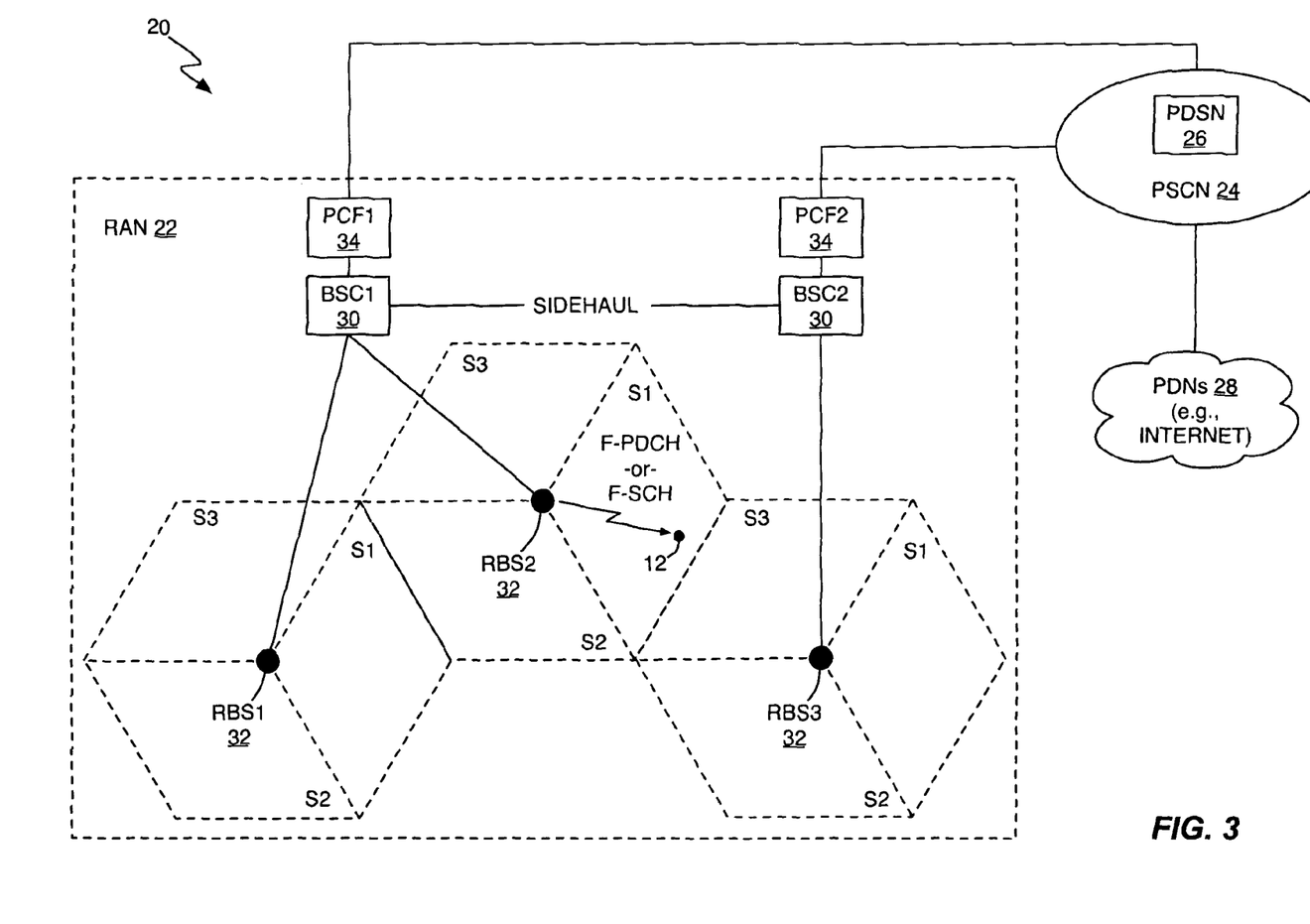
FIG. 3 is a more detailed diagram of source and target base stations, and selected supporting network entities, in a wireless communication network based on cdma2000 standards, for example.

FIG. 3 casts the above exemplary method of operation within the framework of an exemplary wireless communication network 20, which may be a cdma2000 network, for example. In the context of cdma2000 networks, those skilled in the art will appreciate that the IS-2000 standards govern the air interface and signaling protocols, and that the IOS standards govern the inter-entity interfaces, e.g., the BS-to-BS signaling interfaces.

With these points in mind, the exemplary network 20 comprises a Radio Access Network (RAN) 22, and a Packet Switched Core Network (PSCN) 24 that includes a Packet Data Serving Node (PDSN) 26, which provides packet data routing and home/foreign agent advertisement functionality supporting packet data mobility management functions. Together, RAN 22 and PSCN 24 communicatively couple mobile stations 12 to one or more Public Data Networks (PDNs) 28, such as the Internet, and thus allow mobile stations 12 to originate and terminate packet data calls with various other devices or systems having accessible via PDN(s) 28.

RAN 22 supports packet data service across a range of service areas by providing a number of Base Station Controllers (BSCs) 30, with each BSC 30 controlling the operation of one or more Radio Base Stations (RBSs) 32. Further, each BSC 30 includes a Packet Control Function (PCF) 34, or is associated with one, for interfacing with the PDSN 26 of PSCN 24. That is, the PCFs 34 provide the Radio-Packet (RP) interface between the RAN 22 and the PSCN 24.

The RBSs 32 typically are spaced apart to provide more or less overlapping radio coverage for a given geographic region, and each one of them specifically provides radio coverage in a corresponding "cell," which may be divided into a plurality of radio sectors. By way of non-limiting example, each illustrated RBS 32 provides coverage in each one of three sectors, labeled S1 through S3. In the context of FIGS. 1 and 2, and the corresponding discussion herein, the BSC/RBS combination may be understood as comprising a BS 10.

Since those skilled in the art will appreciate that the radio transceiver circuits of each RBS 32 may be sectorized, such that each sector supported by the RBS 32 effectively is a different service area, it will be understood that the earlier described boundary regions exist at the borders between sectors. However, that understanding should be qualified by the statement that the boundary regions between sectors of the same RBS 32 generally are not problematic with respect to continuing packet data service to a mobile station 12 on the F-PDCH, as the packet data traffic for a given mobile station can be transferred from the F-PDCH being transmitted in one sector of a given RBS 32, to the F-PDCH of another sector of that same RBS 32 without difficulty.

Thus, in one embodiment the present invention more particularly addresses the challenge of continuing packet data service to a given mobile station 12, where that service is being provided on the F-PDCH in one sector of a first RBS 32 as the mobile station 12 moves into the boundary region with one or more adjacent sectors controlled by other RBS(s) 32. Another embodiment addresses the converse challenge of switching a given mobile station's packet data traffic from a F-SCH to a F-PDCH responsive to the mobile station 12 moving back into the service area of its source RBS 32.

For example, in FIG. 3, one might imagine RBS2 beginning service to the illustrated mobile station 12 on the F-PDCH of sector S1 of RBS2. One might further imagine that mobile station 12 during that call moves toward the boundary region of sector S1 of RBS2 and sector S3 of RBS3. It may be that RBS3 does not offer F-PDCH service, or it may be that network 20 is configured according to standards not providing for F-PDCH handoff between BSCs 30 (i.e., no provision for inter-BSC F-PDCH handoff), such that BSC1 and BSC2 cannot cooperate to continue F-PDCH packet data service as the mobile station 12 moves into (and possibly through) the boundary region of RBS2/S1 and RBS3/S3.

Thus, BSC1 can be configured to monitor signal quality reports from the mobile station 12 as it operates within S1 of RBS2, and to detect when it has moved into the boundary region. BSC1 may be further configured to terminate packet data service to the mobile station 12 on the F-PDCH of RBS2/S1, and assign a F-SCH to the mobile station 12 in RBS2/S1, so that packet data service can be continued. As noted, the decision to switch the mobile station 12 from F-PDCH service to F-SCH service may additionally or alternatively be predicated on whether network resources are better utilized by continuing F-PDCH service or by switching to F-SCH service, and/or predicated on which channel type allows the mobile station's Quality-of-Service (QoS) requirements to be met.

Once the mobile station 12 has been changed over such that the packet data traffic formerly carried by the F-PDCH is now carried by a dedicated F-SCH, BSC1 may initiate soft handoff of the mobile station 12 with BSC2 as the target base station. In that manner, BSC1 can send the packet data traffic across the sidehaul links (e.g., A3/A7 interface) to BSC2, so that the packet data traffic can be transmitted on an additional F-SCH assigned to the mobile station 12 in sector S3 of RBS3. If, and when, the mobile station 12 moves back toward RBS2, the process can be reversed and the mobile station's packet data traffic can be switched back to the F-PDCH of RBS2/S1.

Also, similar processing can be applied to the scenario where the mobile station 12 originates a voice call or a low-rate packet data call in S1 of RBS2 for example. That call is supported by the assignment of a dedicated F-FCH, which may be carried in soft handoff across the boundary region and into S3 of RBS3, because sidehaul signaling between BSCs for F-FCH traffic is supported by the current IOS standards. If a F-SCH is then assigned to the mobile station 12 in S3 of RBS3 while that the F-FCH call is still active, BSC1 supports that call as the source base station, and F-SCH traffic for the mobile station 12 is sent from BSC1 across the sidehaul to BSC2, for transmission by RBS3 on the assigned F-SCH.

In this scenario, according to the present invention, if the mobile station 12 then moves back toward a service area of BSC1, the packet data traffic being carried by the F-SCH can be switched over to a F-PDCH being transmitted in that service area of BSC1. Thus, where another BSC/RBS assigns a F-SCH to a given mobile station 12, the traffic may be later switched over to a F-PDCH. Of course, the process of making that switchover can be qualified by considering whether the current network resource availability conditions, and/or the current congestion conditions, favor the switchover from F-SCH service to F-PDCH service.

Figure 4:
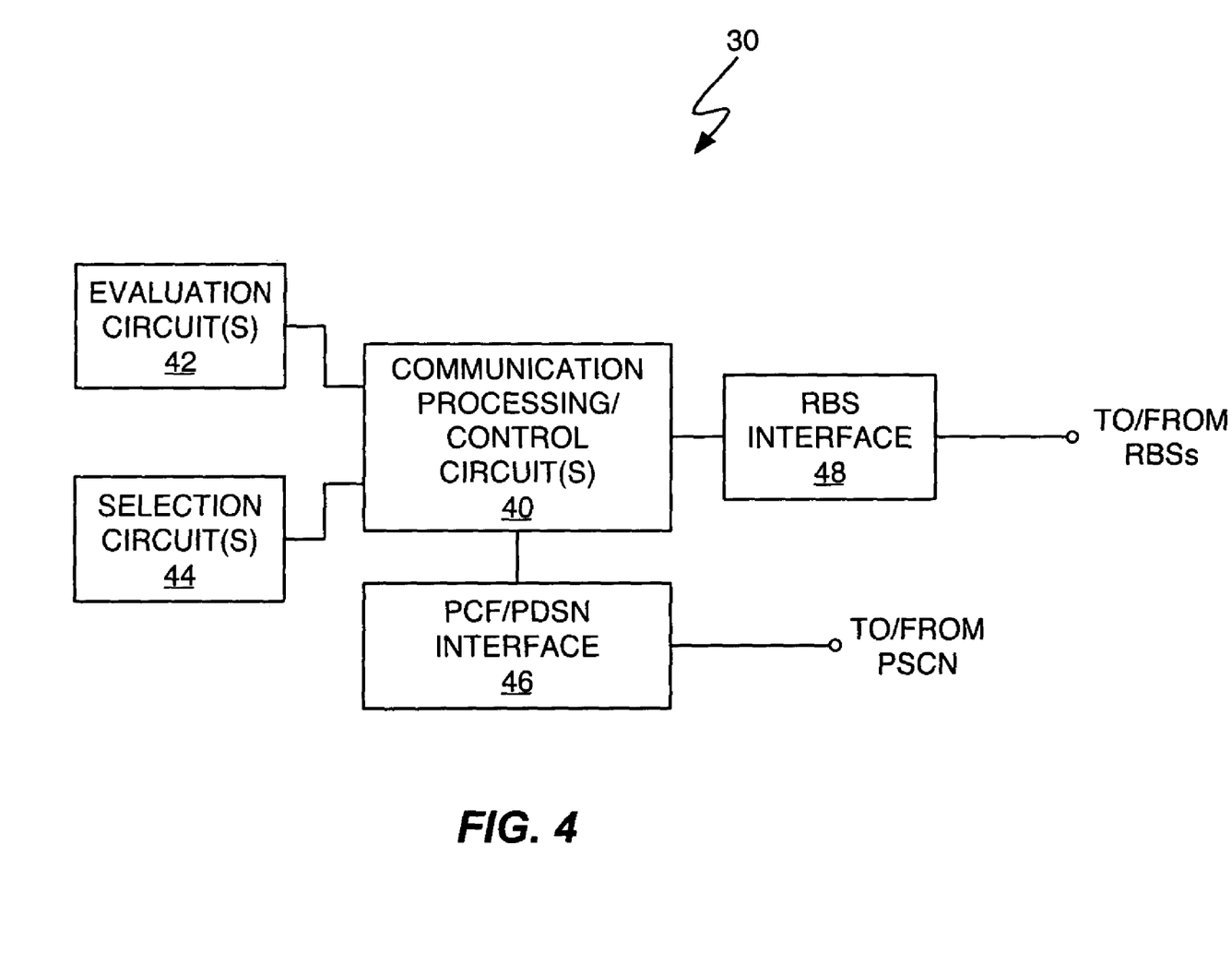
FIG. 4 is a diagram of exemplary base station controller details corresponding to the base station controllers illustrated in FIG. 3.

Supporting these and other operations, FIG. 4 illustrates an exemplary functional arrangement for a BSC 30 according to one or more embodiments of the present invention. The illustrated circuits may be implemented in hardware, software, or some combination thereof, and may comprise dedicated or shared circuits. BSC 30 as illustrated comprises communication/processing control circuits 40, which include, or are associated with, one or more evaluation circuits 42, selection circuits 44, PCF/PDSN interface circuits 46, and RBS interface circuits 48.

Figure 5:
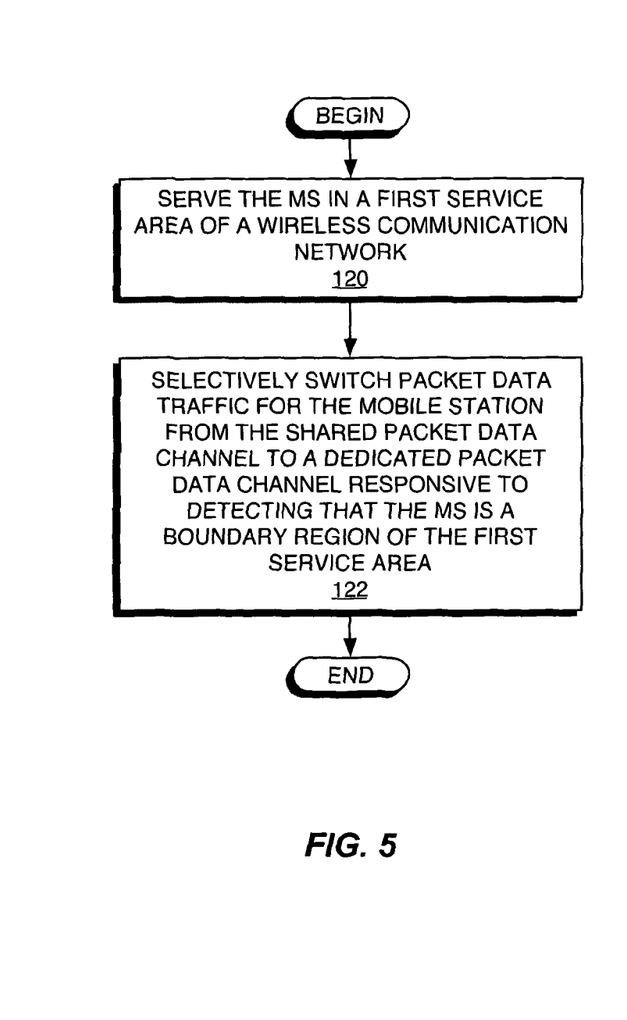
FIG. 5 is a diagram of selective shared-to-dedicated packet data channel switchover according to one or more embodiments of the present invention.

As shown in FIG. 5, the exemplary BSC 30 is configured to serve the mobile station 12 on the first channel type while the mobile station 12 is within a first service area of the BSC 30 (Step 120). BSC 30 is further configured selectively to switch the packet data traffic for a given mobile station 12 from a first type of packet data channel—e.g., a shared packet data channel—to a second type of packet data channel—e.g., a dedicated packet data channel—responsive, for example, to detecting that the mobile station 12 has moved into a service area boundary region (Step 122).

Evaluation circuit(s) 42 are configured to support such operation by detecting that the mobile station 12 is in a boundary region based on, for example, monitoring the mobile station's active set, or a reduced subset of the active set, representing a subset of active set base stations particularly associated with high-rate packet data service to the mobile station 12. Once boundary region operation is detected, the selection circuit(s) 44 may be triggered to cause the communication processing/control circuit(s) 40 to switch the mobile station's packet data traffic from the first channel type to the second channel type.

Alternatively, BSC 30 may be configured to keep serving the mobile station 12 on the first channel type, until the reception conditions at the mobile station 12 may such service undesirable in terms of received signal quality at the mobile station 12, and/or in terms of inefficient utilization of the first channel type. Also, the evaluation circuits 42 and/or the selection circuits 44 may be configured to consider spreading code, transmit power, and other network resource availabilities in determining whether to switchover the mobile station's packet data traffic.

Figure 6:
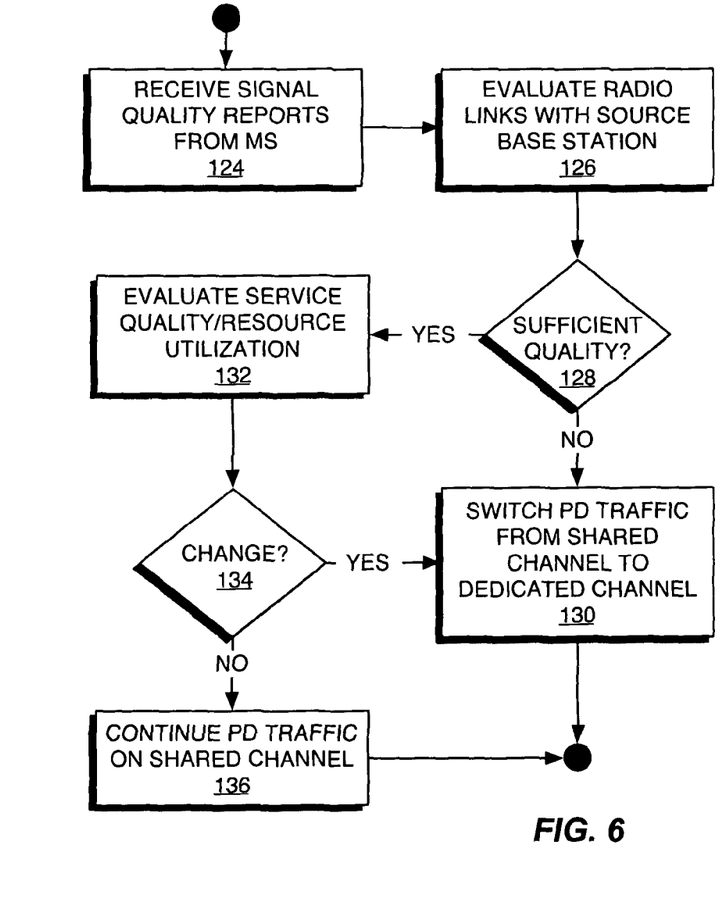
FIG. 6 is a diagram of supporting details for the selective switchover processing of FIG. 5.

FIG. 6 illustrates source BSC processing logic supporting an exemplary embodiment of the above switchover evaluation process, wherein the source BSC 30 is serving a given mobile station 12 on a shared packet data channel, e.g., a F-PDCH. The source BSC 30 receives signal quality reports directly or indirectly from the mobile station 12 (Step 124), and uses these reports to evaluate radio link quality for the radio link(s) established between one or more of its RBSs 32 and the mobile station 12 (Step 126). Generally, the radio link evaluation includes consideration of the radio link quality at the mobile station 12 relative to one or more RBSs 32 that are associated with one or more neighboring BSCs 30 that are potential handoff targets.

In one embodiment, the source BSC 30 compares its radio link quality for the mobile station 12 to one or more defined thresholds, which may be cast in terms of minimum received signal strength and/or in terms of minimum serving data rates or Quality-of-Service constraints (Step 128). If the source BSC 30 determines that it does not have at least one radio link with the mobile station 12 of sufficient quality to sustain shared packet data channel service, it stops packet data service to the mobile station 12 on the shared packet data channel—e.g., a F-PDCH—and begins service to the mobile station 12 on a dedicated packet data channel—e.g., a F-SCH—which may be newly assigned for purposes of supporting this traffic switchover (Step 130).

If, however, source BSC 30 determines that it still has sufficient link quality to support packet data service to the mobile station 12 on the shared packet data channel, it generally continues service on that channel. However, the source BSC 30 may make an additional evaluation (Step 132), wherein it determines whether continued service on the shared packet data channel is more advantageous (Step 134).

As used here, "advantageous" may be defined in terms of network resource utilization for shared channel service as compared to the resource utilization if the mobile station 12 were switched over to a dedicated packet data channel. Advantageous also may be defined in terms of whether the shared channel or the dedicated channel (possibly in soft handoff with diversity gains) would provide better service to the mobile station 12. If it would be more advantageous to serve the mobile station 12 on the shared channel, then packet data service on the shared channel is continued (Step 136). Otherwise, if it would be more advantageous to serve the mobile station 12 on a dedicated channel, the packet data traffic for the mobile station 12 is switched from the shared channel to a dedicated channel.

Thus, the decision to switchover the packet data traffic for a given mobile station from a F-PDCH to a F-SCH can be made based on comparing source and target base station pilot strengths as reported by the mobile station for its active set (or reduced active set) of base stations. That decision can be a simple one, such as where the changeover is made if the target base station provides a stronger pilot, or if there are more target base station radio links of sufficient quality than there are source base station radio links. Or, the comparison can be more sophisticated, such as where the base station attempts to determine whether the mobile station 12 would be better served in terms of effective data rate, QoS, etc., by making, or not making, the switchover, as the mobile station 12 moves into a given boundary region. With that approach, the switchover can be delayed until the effective F-PDCH data rate for the mobile station falls below a minimum, and/or where the network determines that resource utilization conditions favor the discontinuation of F-PDCH packet data service and the allocation of a F-SCH to continue that service into (and across) a given boundary region.

In any case, those skilled in the art should appreciate that the present invention is not limited by the foregoing discussion, nor by the accompanying figures. Rather, the present invention is limited only by the following claims, and their reasonable legal equivalents.

What is claimed is:

1. A method of providing packet data service to a mobile station comprising:
    serving the mobile station in a first service area of a wireless communication network using a shared packet data channel, wherein the shared packet data channel carries high-rate packet data traffic for a plurality of mobile stations according to time-multiplexed transmissions of individual user data on a Code Division Multiple Access (CDMA) carrier signal; and
    selectively switching packet data traffic for the mobile station from the shared packet data channel to a dedicated packet data channel in the first service area, responsive to detecting that the mobile station is in a boundary region of the first service area that corresponds to a base station controller service boundary and that is a boundary region with respect to a second service area that supports shared packet data channel service but does not support handoff of the shared packet data channel service;

wherein said selective switching comprises:

ending transmission of packet data traffic for the mobile station on the shared packet data channel;

beginning transmission of packet data traffic for the mobile station on the dedicated packet data channel; and initiating soft handoff of the mobile station on the dedicated packet data channel by transmitting packet data traffic for the mobile station on the dedicated packet data channel in the first service area and sending the packet data traffic from a first base station controller in the first service area to another base station controller in the second service area via a sidehaul connection between the base station controllers, for transmission to the mobile station on another dedicated packet data channel in the second service area.

2. The method of claim 1, wherein the network comprises a cdma2000 wireless communication network, the shared packet data channel comprises a Forward Packet Data Channel (F-PDCH), and the dedicated packet data channel comprises a Forward Supplemental Channel (F-SCH).

3. The method of claim 1, wherein selectively switching packet data traffic for the mobile station from the shared packet data channel to a dedicated packet data channel comprises switching packet data traffic from the shared packet data channel to the dedicated packet data channel responsive to detecting that received signal quality at the mobile station relative to the first service area is below a defined threshold.

4. The method of claim 1, wherein selectively switching packet data traffic for the mobile station from the shared packet data channel to a dedicated packet data channel comprises switching packet data traffic for the mobile station from the shared packet data channel to the dedicated packet data channel if the boundary region corresponds to a shared packet data channel service boundary.

5. The method of claim 1, wherein selectively switching packet data traffic for the mobile station from the shared packet data channel to a dedicated packet data channel comprises determining whether to switch the packet data traffic for the mobile station from the shared packet data channel to the dedicated packet data channel based on evaluating received signal qualities as reported by the mobile station for the first service area and one or more adjacent service areas associated with the boundary region.

6. A base station controller configured to support packet data service to a mobile station, and comprising one or more processing circuits configured to:

select a shared packet data channel for serving the mobile station in a first service area associated with the base station controller, wherein the shared packet data channel carries high-rate packet data traffic for a plurality of mobile stations according to time-multiplexed transmissions of individual user data on a Code Division Multiple Access (CDMA) carrier signal; and selectively switch packet data traffic for the mobile station from the shared packet data channel to a dedicated packet data channel in the first service area, responsive to detecting that the mobile station is in a boundary region of the first service area that corresponds to a base station controller service boundary and that is a boundary region with respect to a second service area that supports shared packet data channel service but does not support handoff of the shared packet data channel service;

wherein the base station controller is configured to switch packet data traffic for the mobile station from the shared packet data channel to the dedicated packet data channel, and to place the mobile station into soft handoff on the dedicated packet data channel, responsive to evaluating received signal quality information returned by the mobile station for the first service area and one or more adjacent service areas, by:

transmitting packet data for the mobile station on the dedicated packet data channel in the first service area; and sending the packet data from a first base station controller in the first service area to another base station controller in the second service area via a sidehaul connection between the base station controllers, for transmission to the mobile station on another dedicated packet data channel in the second service area.

7. The base station controller of claim 6, wherein the base station controller comprises a cdma2000 base station controller, the shared packet data channel comprises a Forward Packet Data Channel (F-PDCH), and the dedicated packet data channel comprises a Forward Supplemental Channel (F-SCH).

8. The base station controller of claim 6, wherein the base station controller is configured serve the mobile station using the shared packet data channel if received signal quality at the mobile station relative to the first service area is above a defined threshold, and otherwise serve the mobile station using the dedicated packet data channel.

9. The base station controller of claim 6, wherein the base station controller is configured to switch packet data traffic for the mobile station from the shared packet data channel to the dedicated packet data channel if the boundary region corresponds to a shared packet data channel boundary.

10. The base station controller of claim 6, wherein the base station controller is configured to determine whether to switch the packet data for the mobile station from the shared packet data channel to the dedicated packet data channel based on evaluating received signal qualities as reported by the mobile station for the first service area and one or more adjacent service areas associated with the boundary region.

11. The base station controller of claim 6, wherein the one or more processing circuits comprise an evaluation circuit configured to evaluate signal quality reports from the mobile station relating to transmissions from the first service area and one or more adjacent service areas associated with the boundary region, and a selection circuit configured to select the dedicated packet data channel for serving the mobile station, rather than the shared packet data channel, responsive to the evaluation circuit.

* * * * *

UNITED STATES PATENT AND TRADEMARK OFFICE
CERTIFICATE OF CORRECTION

PATENT NO. : 8,175,031 B2  
APPLICATION NO. : 10/992301  
DATED : May 8, 2012  
INVENTOR(S) : Vannithamby It is certified that error appears in the above-identified patent and that said Letters Patent is hereby corrected as shown below:

On Page 2, in Field (56), under "FOREIGN PATENT DOCUMENTS", in Column 1,
Line 7, delete "WO WO 02/067606".

On Page 2, in Field (56), under "OTHER PUBLICATIONS", in Column 2, Line 2,
delete "11/018,36," and insert -- 11/018,361, --, therefor.

In Fig. 2, Sheet 2 of 5, in Box "104", in Line 3,
delete "SHO W/NEIGHBORING" and insert -- SHOW/NEIGHBORING --, therefor.

In Column 12, Line 35, in Claim 8, delete "serve" and insert -- to serve --, therefor.

Signed and Sealed this
Thirteenth Day of November, 2012

David J. Kappos
*Director of the United States Patent and Trademark Office*